UNITED STATES PATENT OFFICE.

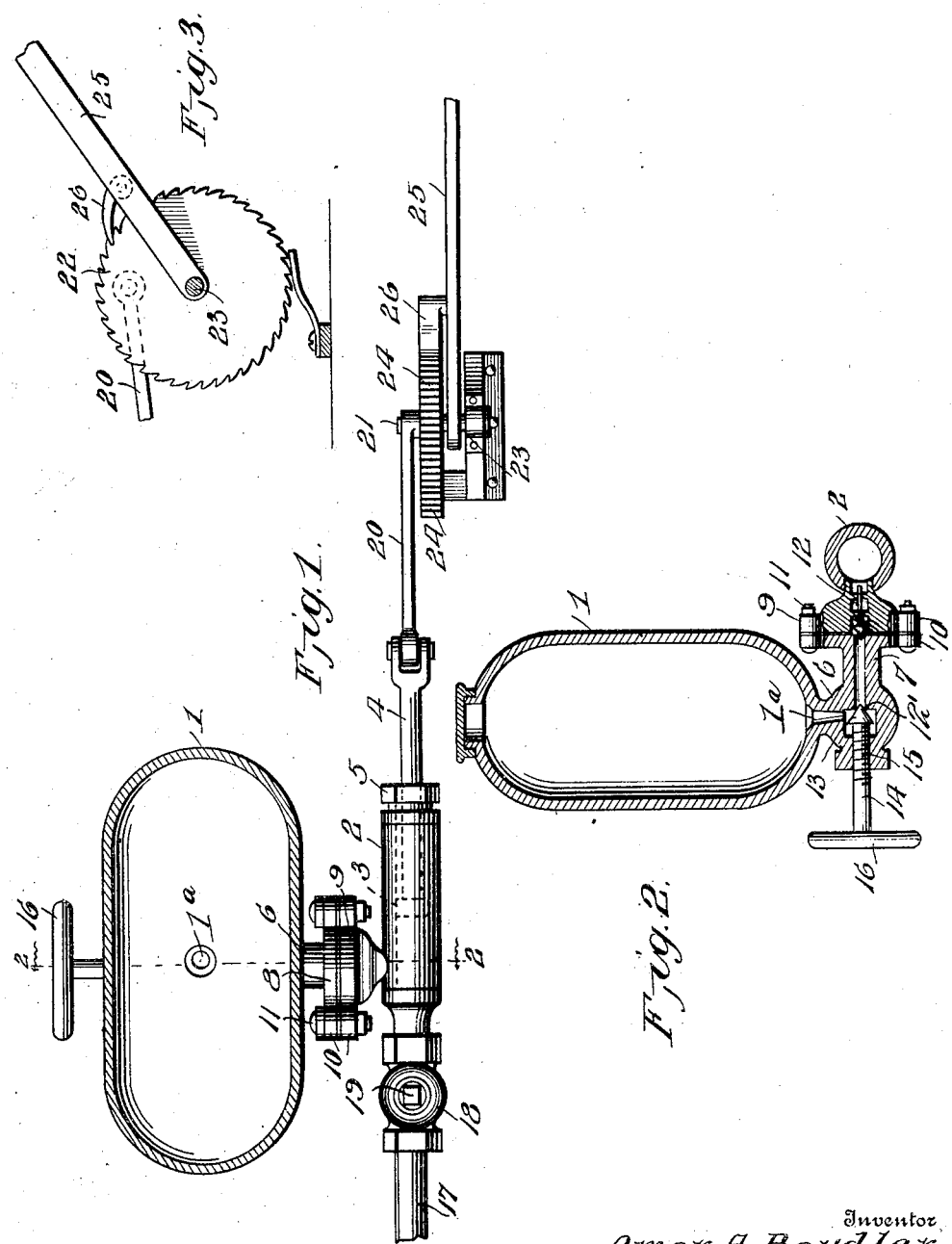

OMER A. BEYDLER, OF ROSSVILLE, INDIANA.

ENGINE-LUBRICATOR.

No. 853,757.　　Specification of Letters Patent.　　Patented May 14, 1907.

Application filed October 27, 1906. Serial No. 340,874.

*To all whom it may concern:*

Be it known that I, OMER A. BEYDLER, a citizen of the United States of America, residing at Rossville, in the county of Clinton and State of Indiana, have invented new and useful Improvements in Engine-Lubricators, of which the following is a specification.

This invention relates to lubricators for steam and other engines, the object of the invention being to provide simple and effective means automatically operated by the engine gearing for forcibly injecting a stream or quantity of oil or other lubricating medium to the piston cylinder or other part to be lubricated.

In the accompanying drawings, Figure 1 is a top plan view of a lubricator embodying my invention. Fig. 2 is a vertical transverse section through the reservoir and pump on line 2—2 of Fig. 1. Fig. 3 is a detail view in side elevation of the gearing for intermittently actuating the pump piston.

Referring to the drawing, 1 designates an oil reservoir; 2, a pump cylinder in which operates a piston 3, the rod 4 of which projects rearwardly from the cylinder and works through a suitable stuffing box 5. The reservoir is provided with a discharge port 1ª and with an outlet connection 6 leading from the bottom thereof and connecting said port with a lateral inlet connection 7 disposed at the forward end of the pump cylinder. The connections are provided with abutting heads 8 and 9 and coupling flanges or ears 10, bolts 11 being passed through the latter to unite said connections. The meeting faces of the connections are formed to provide a valve chamber in which is a spring-closing valve 12 adapted to automatically open upon the back stroke of the piston to allow oil from the reservoir to pass into the cylinder and to close upon the forward stroke of said piston to cut off the flow of oil from the reservoir. The connection 6 is provided with a tapered valve seat 12′ adapted to be engaged by a correspondingly shaped valve 13, the stem 14 of which is revolubly supported upon the base of the reservoir and has a threaded connection therewith, as indicated at 15, whereby the movement of the stem in one direction or the other will open or close the valve 13. The outer end of the stem carries a hand wheel 16 by which it may be manually manipulated.

The forward end of the pump cylinder 2 is connected with an oil conducting pipe 17 leading to the steam chest of the engine cylinder or other part to be lubricated. The connection between the pump cylinder and pipe 17 comprises a valve casing 18 in which is a check valve 19, said valve being adapted to open upon the forward movement of the piston to allow the expelled oil to pass into the pipe 17 and to close upon the back stroke of the piston.

The outer end of the piston rod 4 is connected by a pitman 20 with a crank or wrist pin 21 on a crank wheel 22 arranged upon a suitably journaled shaft 23, said wheel being formed with an annular series of ratchet teeth 24. A vertically oscillating rod 25 is pivotally mounted at its forward end upon the shaft 23 and is adapted to be connected at its opposite end to the eccentric rod or some other suitable reciprocating part of the engine gearing. The rod 25 carries a pawl 26 adapted in its oscillating movements to engage the ratchet teeth 24, to alternately and intermittently communicate backward and forward motion to the piston through the action of the crank pin 21 and pitman 20.

On the forward motion of the rod 25 the pawl 26 engages and imparts a forward revolution to the wheel 22 a distance equivalent to the distance of one or more teeth, and this action is continued intermittently to force the piston forward step by step until it reaches the end of its forward stroke to expel the oil previously taken into the pump cylinder. When the crank pin 21 on such motion of the wheel passes below the horizontal line of the axis of the wheel and becomes a part of the return portion of the wheel reverse motion is imparted to the piston in an obvious manner by the action of the pawl and ratchet to operate the piston on its suction stroke, whereby oil will be drawn from the reservoir, the amount of oil discharging from the reservoir on each suction movement of the piston being regulated by the valve 13.

It will be obvious from the foregoing description that the construction is such as to secure an automatic feed of oil to the parts to be lubricated by the action of the lubricator driven from the engine gearing, a small quantity of oil being fed forward on each forcing motion of the piston, a proper quantity of oil on each complete operation of the pump being fed to the engine cylinder or other part to keep the same constantly lubricated by the supply thereto of a regulated amount of oil.

Having thus described the invention, what is claimed as new, is:—

The herein-described automatic lubricator for engines comprising a reservoir having an outlet in the bottom thereof, a cylinder arranged at one side of and below the bottom of the reservoir, a conducting pipe connecting with the forward end of the cylinder, a cross connection between the reservoir and the cylinder comprising coupled sections respectively fixed to the reservoir and cylinder, the reservoir section being provided with a valve chamber communicating with the outlet and with a feed passage, and the cylinder with a coinciding feed passage, a regulating valve adjustably mounted upon the reservoir section and operating in the valve chamber to control the inner end of the feed passage therein, a spring actuated check valve in the cylinder section adapted to normally close the outer end of the feed passage in the reservoir section, said valve being removable when the sections are uncoupled a piston operating in the cylinder, and means for imparting an intermittent back and forth motion to said piston.

In testimony whereof, I affix my signature in presence of two witnesses.

OMER A. BEYDLER.

Witnesses:
   JESSE M. BEYDLER,
   JOHN C. ROGERS.